United States Patent
Lanz et al.

(10) Patent No.: US 9,542,665 B2
(45) Date of Patent: Jan. 10, 2017

(54) METHODS FOR CREATING, ARRANGING, AND LEVERAGING AN AD-HOC COLLECTION OF HETEROGENEOUS ORGANIZATION COMPONENTS

(71) Applicant: OrgSpan, Inc., Durham, NC (US)

(72) Inventors: Eric Lanz, Sunnyvale, CA (US); Karim Nassar, Raleigh, NC (US)

(73) Assignee: Interactive Intelligence Group, Inc., Indianapolis, IN (US)

( * ) Notice: Subject to any disclaimer, the term of this patent is extended or adjusted under 35 U.S.C. 154(b) by 282 days.

(21) Appl. No.: 14/062,461

(22) Filed: Oct. 24, 2013

(65) Prior Publication Data
US 2014/0123032 A1    May 1, 2014

Related U.S. Application Data

(60) Provisional application No. 61/718,411, filed on Oct. 25, 2012.

(51) Int. Cl.
*G06Q 10/10*     (2012.01)
*G06F 3/048*     (2013.01)

(52) U.S. Cl.
CPC .............. *G06Q 10/10* (2013.01); *G06F 3/048* (2013.01)

(58) Field of Classification Search
CPC .................................................... H04L 65/403
See application file for complete search history.

(56) References Cited

U.S. PATENT DOCUMENTS

2011/0185286 A1*   7/2011   Moyers ................ G06Q 10/10
                                                            715/752

* cited by examiner

*Primary Examiner* — Peiyong Weng

(57) ABSTRACT

Methods for creating, arranging, and leveraging an ad-hoc collection of heterogeneous organization components are provided. In one example, a method includes the steps of displaying a scratchpad affordance associated with a scratchpad, and detecting an update to the scratchpad based on an input associated with a first organization component of the one or more organization components and the scratchpad affordance. The method includes the additional step of updating the scratchpad based at least in part on the input.

14 Claims, 16 Drawing Sheets

METHODS FOR CREATING, ARRANGING, AND LEVERAGING AN AD-HOC COLLECTION OF HETEROGENEOUS ORGANIZATION COMPONENTS

CROSS-REFERENCE TO RELATED APPLICATIONS

This application claims priority to U.S. Provisional Application No. 61/718,411, filed 25 Oct. 2012 and entitled "METHODS AND SYSTEMS FOR CREATING, ARRANGING, AND LEVERAGING AN AD-HOC COLLECTION OF HETEROGENOUS ORGANIZATION COMPONENTS", the contents of which are incorporated herein as if set forth in full.

FIELD

This invention relates generally to enterprise social media applications, and more specifically to methods for creating, arranging, and leveraging an ad-hoc collection of heterogeneous organization components.

BACKGROUND

Traditional methods for arranging and presenting sets of information to a user in a graphical user interface include lists and tables. These methods may be easy for programmers to implement and for computers to generate, but provide users little to no insight or greater context about the data being presented. Furthermore, such lists or tables typically present a static snapshot of data, oblivious to ongoing changes in the data being presented.

Such traditional lists and tables miss opportunities to present data to users in ways that take advantage of a user's visual processing skills. Thus there is a need for new methods to arrange a collection of organization components.

SUMMARY

Embodiments of the invention provide methods for creating, arranging, and leveraging an ad-hoc collection of heterogeneous organization components. In one aspect, an organization hierarchy application displays a card view. The card view may display a navigable organization hierarchy including one or more individual organization components represented as cards, or profiles, in the graphical user interface. Each one of the cards may be associated with an individual organization component such as an organization member, file, location, or project. Users may interact with the organization data by creating and updating a scratchpad with selected organization components. As the user accesses the scratchpad, the contents may be dynamically updated, and the application may suggest particular actions based on the contents of the scratchpad.

In another aspect, a method comprises displaying an organization hierarchy application comprising an organization component view in a graphical user interface, the organization component view comprising a first organization component, and displaying a scratchpad affordance associated with a scratchpad. The method further comprises detecting an update to the scratchpad based on an input associated with a first organization component of the one or more organization components and the scratchpad affordance, and updating the scratchpad based at least in part on the input.

Further embodiments, features, and advantages of the invention, as well as the structure and operation of the various embodiments of the invention are described in detail below with reference to the accompanying drawings.

BRIEF DESCRIPTION OF THE DRAWINGS

The accompanying drawings, which are incorporated herein and form a part of the specification, illustrate the present invention and, together with the description, serve to explain the principles of the invention and to enable a person skilled in the pertinent art to make and use the invention.

DETAILED DESCRIPTION

Figure 1:
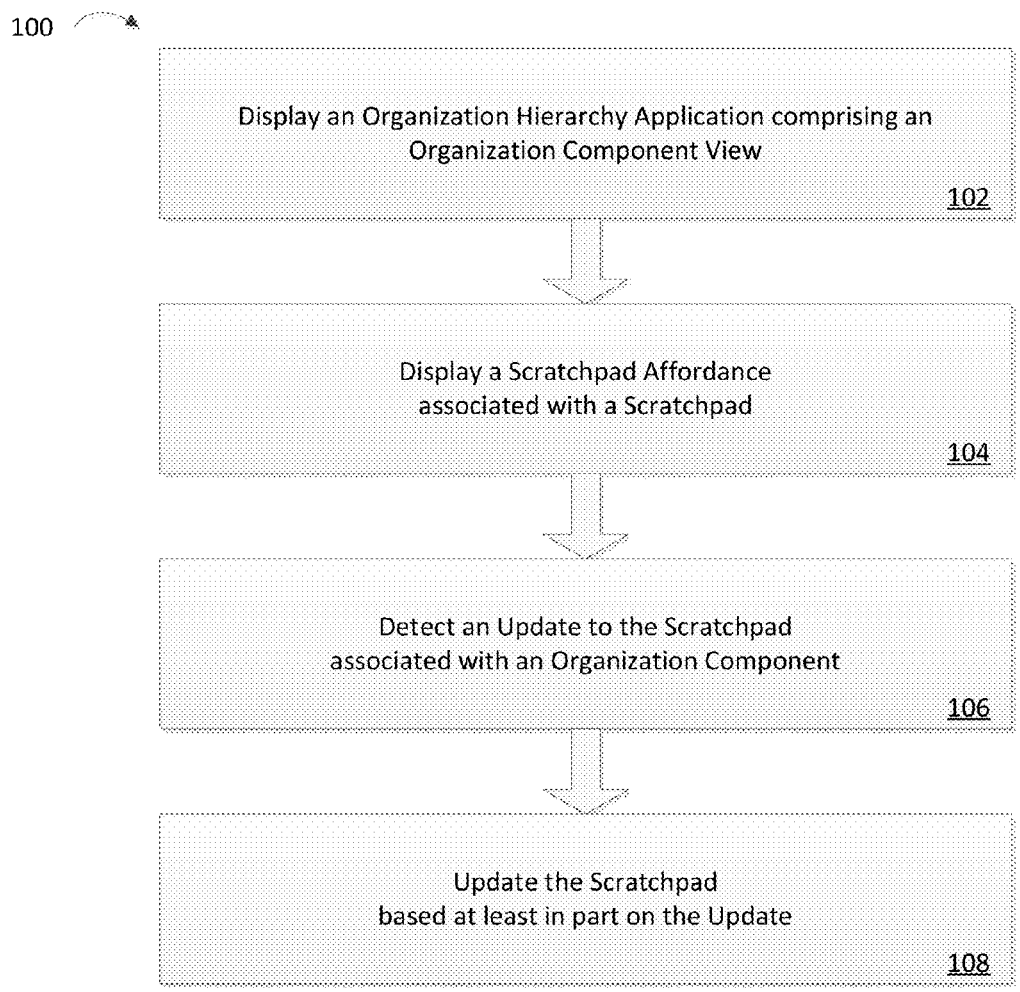
FIG. 1 is a flow chart illustrating a method according to an embodiment.

Embodiments are described for creating, arranging, and leveraging an ad-hoc collection of heterogeneous organization components. Traditional approaches to arranging and presenting information, such as lists or tables, are easy for a computer to understand. A virtual container, or workspace, such as a scratchpad, presents information in ways that are easy for humans to understand. Users may use scratchpads to gather, arrange, and manipulate different types of application components together in one view. Such ad-hoc creation of component groups can take advantage of how individual users visually and spatially process information to help them carry out complex business functions.

In one exemplary embodiment, an organization hierarchy application arranges and displays various heterogeneous organization components, such as people, projects, and meetings, in a graphical user interface. The organization hierarchy application may display the organization components in a variety views, such as a list view, a tree view, star view, favorites view, and/or recents view. As a user browses an organization hierarchy and navigates through different hierarchical levels and individual organization components, users may add organization components to a scratchpad by selecting organization components and dragging them to a scratchpad icon.

In one example, a user may create a new scratchpad to plan and coordinate a meeting. After creating a new scratchpad, the user may add meeting attendees to the scratchpad by browsing the organization hierarchy and dragging individual organization members to the scratchpad. Additionally, the user may drag one or more meeting-related files to the scratchpad. The user may expect to use such files, such as a meeting agenda, presentation slides, or a product demonstration video, to prepare for the meeting, or during the meeting itself.

The organization hierarchy application may analyze the contents of the scratchpad and present the user with contextual actions based on the contents of the scratchpad, such as an option to create a new meeting, invite the selected organization members to the meeting, and email each accepted attendant the presentation slides and meeting agenda. The user may share the scratchpad with different users for viewing and/or editing. During the meeting, a user may access the scratchpad, and visually arrange the attendees, shown in the scratchpad, as they are actually sitting in the meeting. Components displayed in the meeting scratchpad, such as meeting attendees or files, may be dynamically updated as attendees update their status or progress, and the contents of files are edited.

Illustrated Methods

Methods are described which may facilitate the creation and arrangement of ad-hoc collections of organization components into a virtual workspace, or container, such as a scratchpad. Users may add, subtract, reposition, and resize components in a scratchpad on one client, access and update the scratchpad on different clients, and/or share the scratchpad with other users. Such user-defined contents, locations, and sizes of scratchpad components may convey obvious and apparent significance to a user, making it easier for them to organize and process search results, create and manage groups of objects, and plan large meetings.

The dynamic, collaborative, ad-hoc nature of embodiments of a scratchpad provide novel and information-rich views of groups of homogenous or heterogeneous application components between users and across sessions, devices, and platforms. Certain aspects of the scratchpad, such as individual scratchpad components, or a scratchpad background, may reference live data sets that are dynamically updated in real time. One or more aspects of the scratchpad and its contents, such as the identity, type, and/or proximity of the contents of the scratchpad may be analyzed and used to determine context-sensitive suggested actions. The freeform nature of a scratchpad may enable users to accomplish a wide variety of goals or tasks from a single interface responsive to each user.

FIG. 1 is a flow chart illustrating a method according to an embodiment. As shown in FIG. 1, in step 102 of method 100, an application is displayed in a graphical user interface. The application may comprise a web application viewed in a web browser, or a native platform application, such as an iOS iPad application, Android phone application, Windows Phone application, or some other native device application.

In one embodiment the application comprises an organization hierarchy application. An organization hierarchy application may generate one or more views of an organization data set comprising one or more organization components. An organization data set may comprise information related to an organization, such as an organization directory or organization hierarchy. The data set may be stored in a flat file, or, in one alternative in a database, such as an Active Directory database. In another alternative, a data set may comprise a plurality of files and/or sources. Other examples of a data set may comprise a document repository, or a projects/tasks database. The organization hierarchy application may be shown in all or part of a graphical user interface, and may generate one or more views of the data set.

An organization data set may comprise one or more types of organization components. One type of organization component may comprise a person, such as a member of the organization. Another type of organization component may comprise a file, such as a word processing document, presentation slides, a spreadsheet, a video, or a voice mail. Still another type of organization component may comprise a strategic component, such as a goal, objective, strategy, project, action, or task. Other types of organization components may include events (e.g. meetings, webcasts, conferences, drills, scrums), locations (rooms, floors, buildings, campuses, cities, countries, etc.), or resources (e.g. printers, network connections, servers, etc.).

In one embodiment, an organization hierarchy application uses an organization data set to generate an organization chart. The organization chart may comprise one or more organization components arranged according to the organization hierarchy. The organization hierarchy application may generate one or more views of the organization data set. Each view of the data set may show one or more organization components of the same or different types, and may be associated with an affordance.

Examples of views generated by an organization hierarchy application may include a profile view, a recents view, a favorites view, a scratch pad view, an organization chart view, a search view, a personal configuration/preferences view, and an organization configuration view. Some traditional views of organizational data sets, such as a search view, may comprise a simple list of search results.

Figure 9:
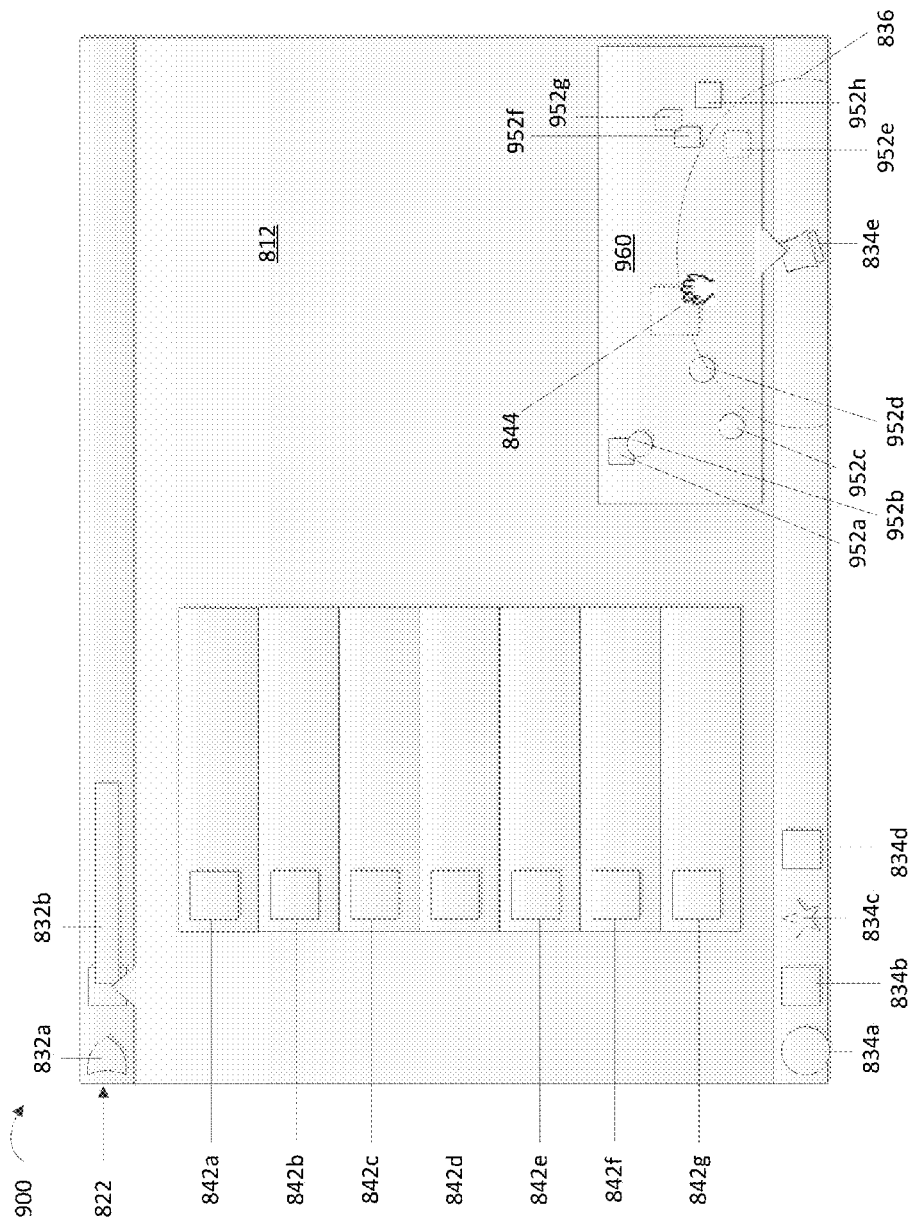

A view of the data set may be accessed by activating an affordance associated with that view. An affordance may comprise a graphical object associated with an interaction with a data set presented by the application. An affordance may be provided, or displayed, in a user interface as a graphical object such as an icon, a button, text navigation link (i.e. hyperlink), or a text entry field. An affordance may comprise implicit or explicit cues for how to interact with the affordance. As one example, a scratchpad affordance may expand to show a view of an associated scratchpad, as illustrated in FIG. 9. As another example, an affordance may change color, shape, or size, when a user moves a mouse cursor over the affordance (i.e. mouse-over), indicating that selecting the affordance may trigger some action.

In step 104, a scratchpad affordance is displayed. Examples of a scratchpad affordance are illustrated in FIGS. 6-16. A scratchpad affordance may be associated with one, two, or more scratchpads. In one embodiment, a plurality of scratchpads may be accessed and/or viewed from a single scratchpad affordance, such as a scratchpad selection affordance. In another embodiment, a separate scratchpad affordance may be displayed by an application for each scratchpad accessible by a user.

In step 106, an update to the scratchpad is detected. An update to the scratchpad may comprise a change in the contents of the scratchpad, such as additional new components, the deletion of existing components in the scratchpad, or a change to one or more components in the scratchpad, such as an updated status. In one embodiment, an update to the scratchpad may be detected based on an input associated with an organization component. In another embodiment, an update to a scratchpad may be detected based on a notification associated with an organization component.

An update to a scratchpad may be detected based on the detection of a user input. In one embodiment, a user may update a scratchpad through a movement gesture in a graphical user interface, such as a swiping gesture or a drag-and-drop input. Users may drag organization components from one or more views to a scratchpad affordance, and drop any selected organization components onto the scratchpad affordance, a compact view of a scratchpad, or even a temporary full view of the scratchpad.

Figure 8:
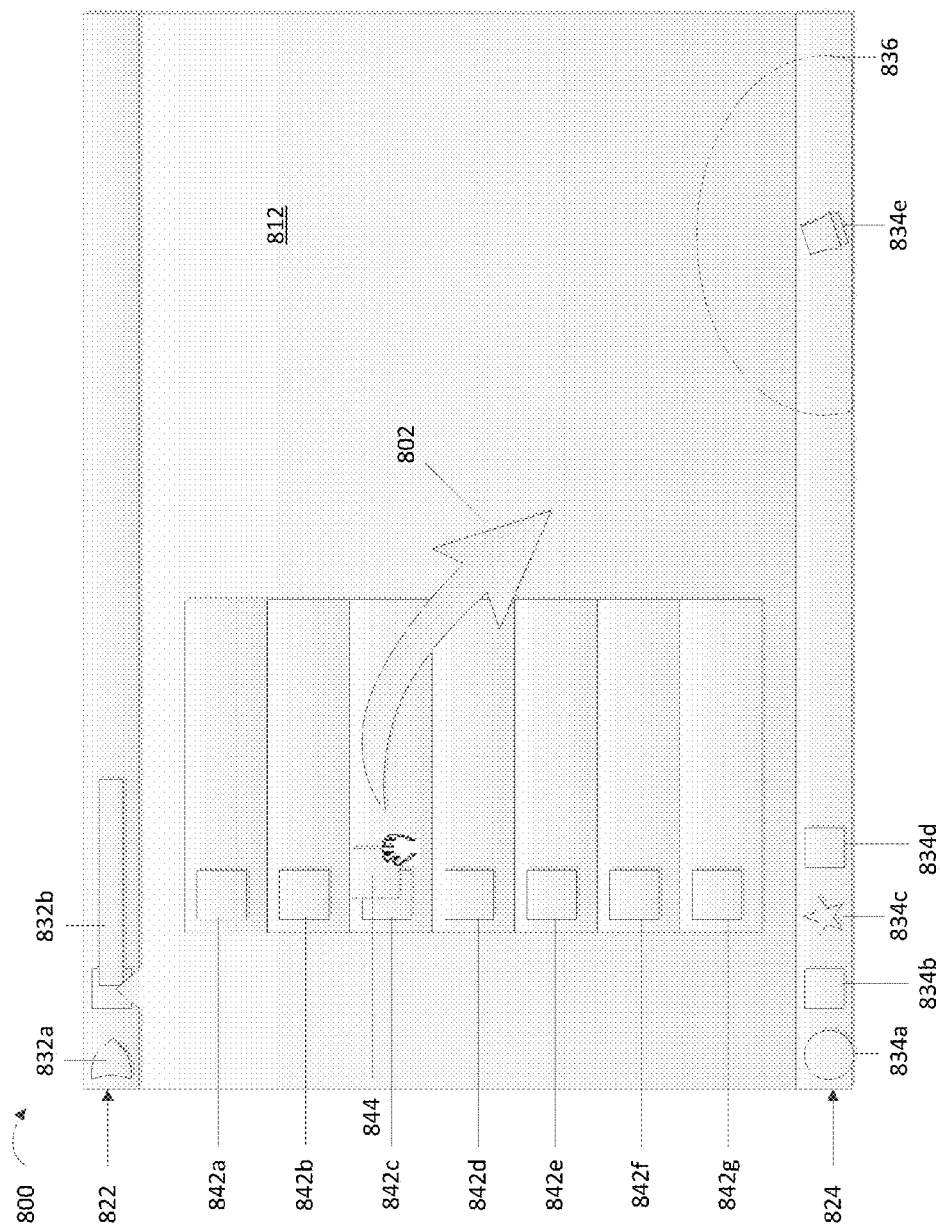
FIGS. 8-13 are diagrams illustrating another embodiment for creating, arranging, and leveraging an ad-hoc collection of heterogeneous organization components.
Figure 14:
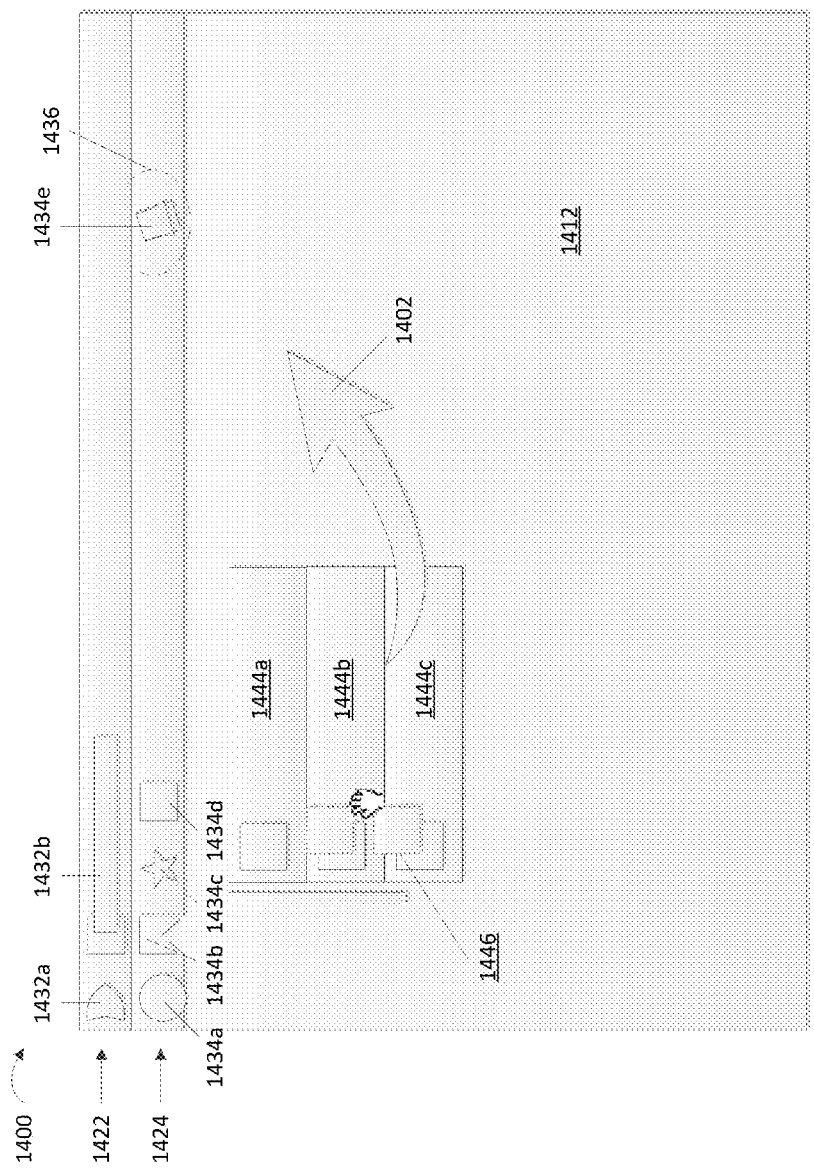
FIGS. 14-16 are diagrams illustrating another embodiment for creating, arranging, and leveraging an ad-hoc collection of heterogeneous organization components.
Figure 15:
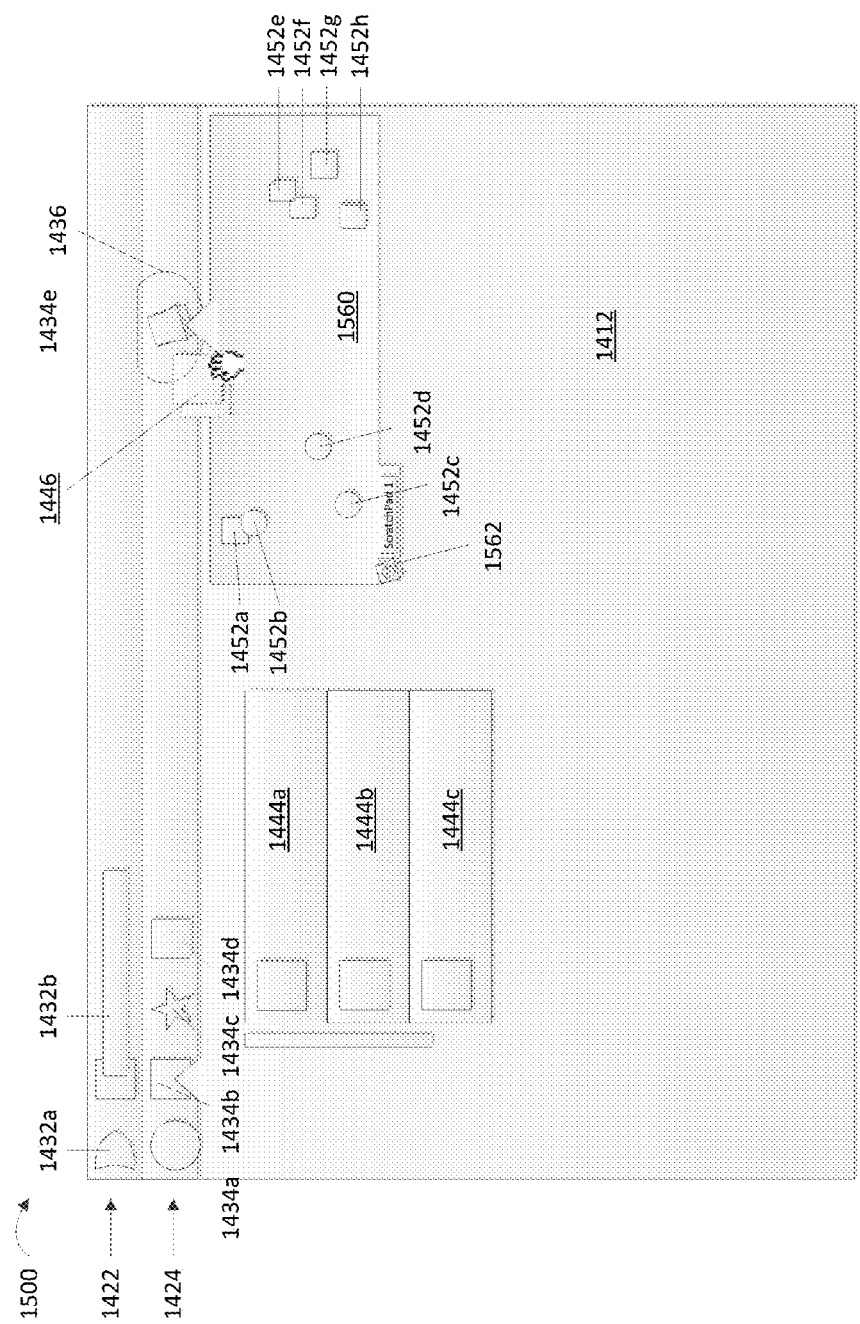
Figure 16:
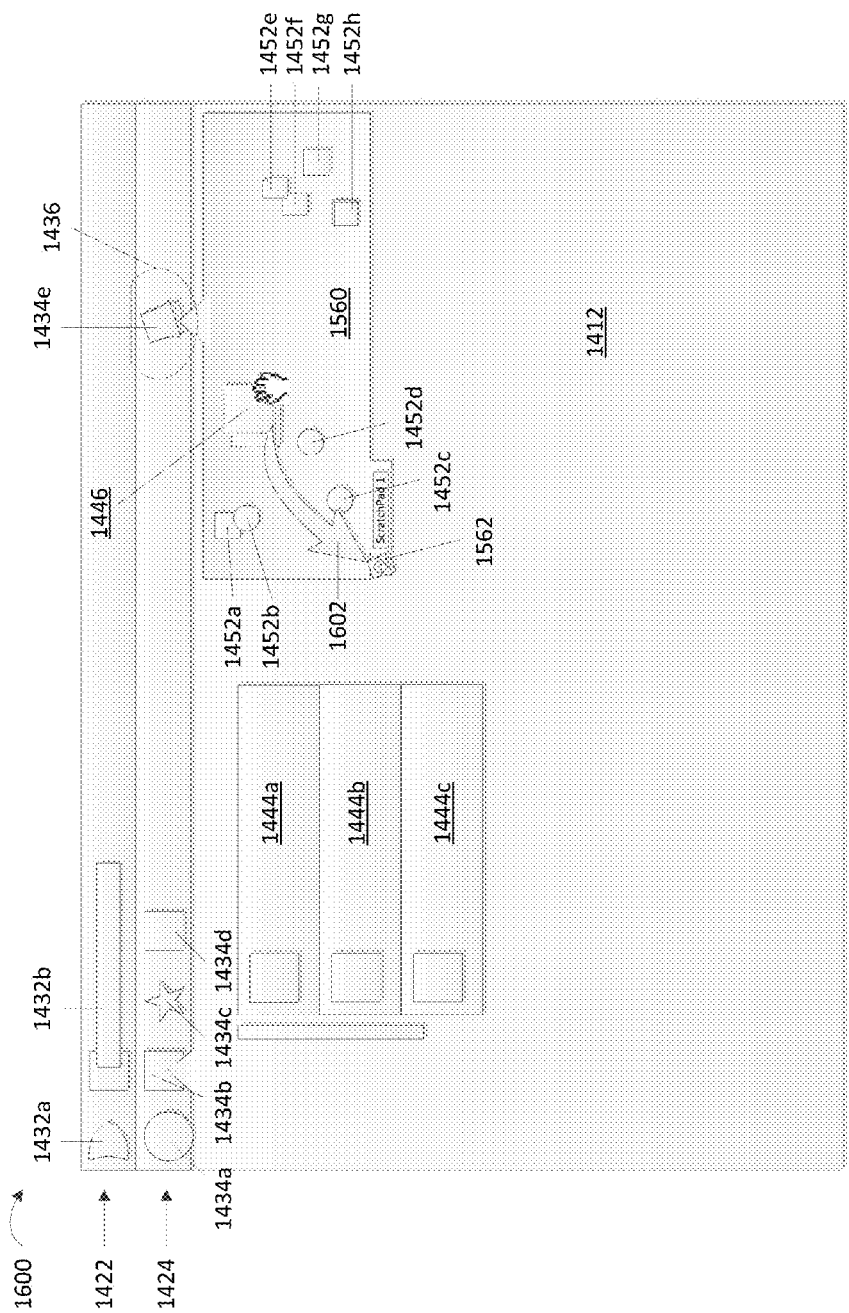

In one illustrated example, FIGS. 8-9 depict an update to a scratchpad based on a drag-and-drop input. In FIG. 8, component selection 844 is dragged in the direction of arrow 802 towards a scratchpad affordance, and in FIG. 9, component selection 844 may be dropped onto compact scratchpad view 960. In another illustrated example, FIGS. 14-16 depict detection of an update to a scratchpad based on a dragging input associated with component selection 1446. As one alternative to a drag-and-drop input, a user may update a scratchpad through a menu system. For example, a user may select one or more organization components, and access a menu to add the selected components to a scratchpad.

A scratchpad may be remotely updated. In an embodiment, an update to a scratchpad may be detected based on a notification associated with an organization component. The contents of a scratchpad, e.g. one or more scratchpad components, may each comprise an active, live data-set that may be updated locally or remotely. As an example, a project leader may create a project scratchpad on their local client. The project scratchpad may be updated to include organization members assigned to the project, as well as the project itself. The project leader may share the project scratchpad with each assigned organization member, such that each assigned organization member can access and view the project scratchpad. While the project leader is viewing the project scratchpad on her client device, an assigned organization member may update the progress of the overall project, for example, by incrementing a percentage done from 25% to 35%. This updated progress may be reflected in the project scratchpad as it is viewed by the project leader.

As another example, a project scratchpad may include one or more project files that are needed for the project. While users access certain project files, those files may be unavailable to other users. Representations of those unavailable files in a project scratchpad may be shown with a visual indication of their availability, such as an x-icon, or with lower intensity/grayed-out. As one alternative, unavailable project files may be temporarily shrunk in a scratchpad, while icons associated with available files may be expanded. In some embodiments, aspects of a scratchpad may be automatically updated or manipulated.

In step 108, the scratchpad is updated based at least in part on the input. In one embodiment, the organization component may be added to the scratchpad where the user dropped the organization component into a compact view of the scratchpad. In another embodiment, an organization component in the scratchpad may be updated to reflect a remote update. For example, a scratchpad may be associated with a meeting, and be accessed and viewed by each meeting invitee. The contents of the meeting scratchpad may include the invited participants to a meeting. Immediately before a meeting, one participant may update their status to "stuck in traffic." Other meeting participants accessing the meeting scratchpad may immediately see the change in status.

An update to a scratchpad may comprise a change in the contents of the scratchpad. A user may interact with a scratchpad, by adding application components to the scratchpad, repositioning them in the scratchpad, and/or resizing application components in the scratchpad. Such interactions with a scratchpad may be performed on a first local device, and in various embodiments, propagate across a network and be accessible to remote devices.

In one embodiment, a notification may be generated after a scratchpad is updated. A notification may comprise several elements, such as the identity, size, and/or location of a new scratchpad component. The notification may comprise a unique identifier associated with the organization component added to the scratchpad. The notification may comprise the location of the newly added organization component in the scratchpad. The notification may comprise the size of a scratchpad component.

A notification may be generated and received by a server. A scratchpad may be stored on a server, and accessed by one or more remote clients. By storing and/or synchronizing a scratchpad on a server, embodiments may be highly reliable and accessible across multiple clients and/or multiple users. A scratchpad stored on a server may comprise one or more unique component identifiers, a position, and/or a size of each scratchpad component. In one embodiment, a server stores a reference for each object in a scratchpad. Accordingly, when an object is remotely updated, the reference in the scratchpad may be automatically updated to reflect the change.

In some embodiments, the elements of a scratchpad stored on a server may facilitate the scratchpad to be drawn at any resolution on a wide range of devices, from smart phones to tablets to personal computers. Additionally, by limiting the number of elements associated with a scratchpad stored by a server, a scratchpad may be quickly and easily shared with a large group of users.

Figure 2:
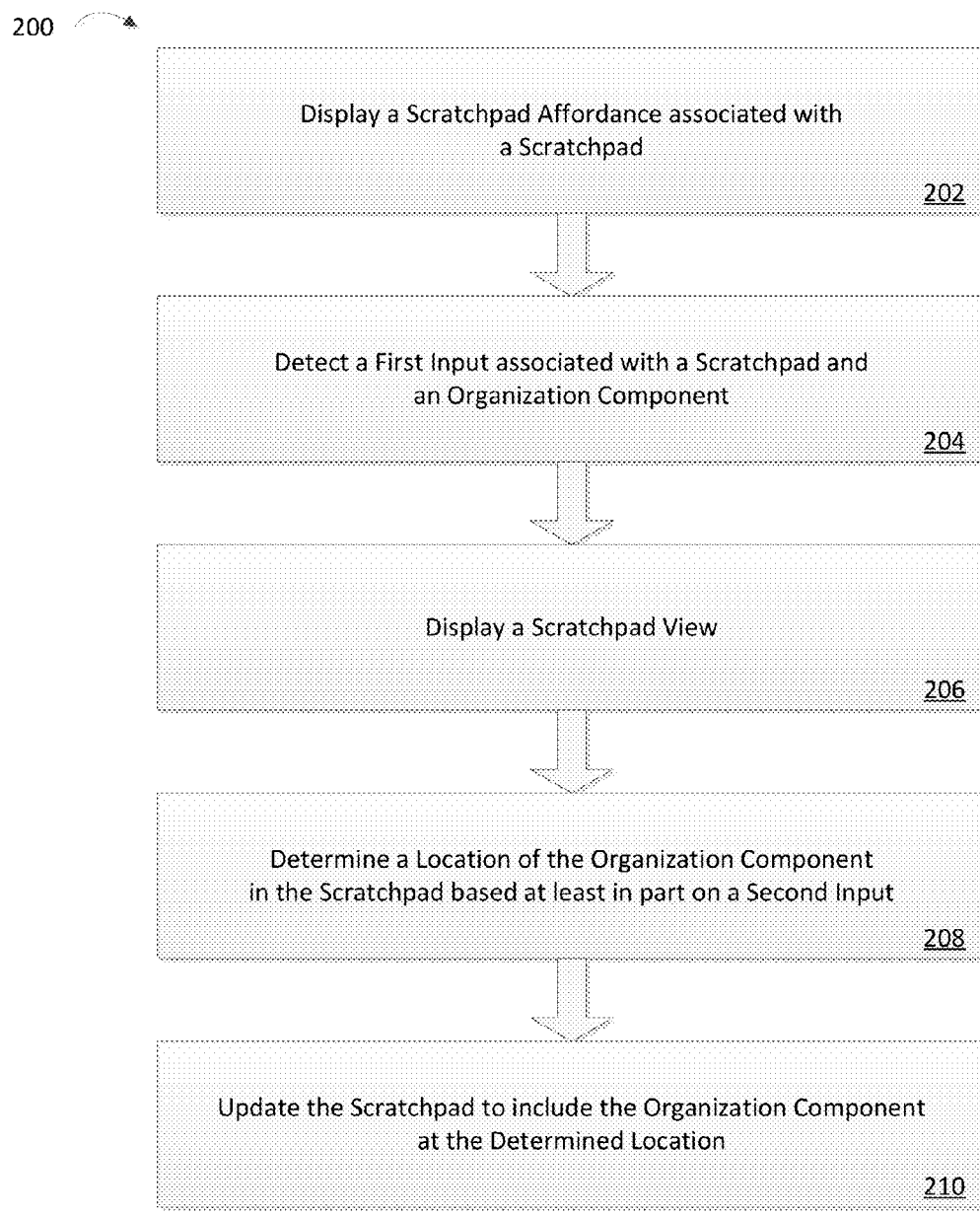
FIG. 2 is a flow chart illustrating a method according to another embodiment.

FIG. 2 is a flow chart illustrating a method according to another embodiment. As illustrated in FIG. 2, in step 202 of method 200, a scratchpad affordance associated with a scratchpad is displayed. The scratchpad affordance may be generated by an organization hierarchy application in a graphical user interface. As described above, a scratchpad affordance may comprise a graphical object, such as a scratchpad icon.

In step 204, a first input associated with a scratchpad and an organization component is detected. The input may be associated with one or more organization components, such as any organization components that are selected by a user immediately before or during the first input. An input associated with a scratchpad may comprise a specific type of gesture in a graphical user interface. For example, a swiping gesture resembling a "plus" may be associated with a scratchpad application. As another example, a drag input towards or onto a scratchpad affordance may be associated with the scratchpad.

An input may be associated with one or more organization components. For example, before making a scratchpad gesture, a user may select one or more organization components. In one embodiment, a user selects a plurality of organization components displayed in a search view, and drags the plurality of organization components toward a scratchpad affordance. In another embodiment, a user may select a single organization component and make a swiping gesture associated with an update to the scratchpad.

In one exemplary embodiment, a user browses an organization hierarchy in a graphical user interface. A user selects a plurality of organization members in the organization hierarchy by ctrl-clicking on each member. Next, the user drags the selected organization members toward a scratchpad affordance in the graphical user interface.

An organization hierarchy application may detect the first input as a user drags one or more organization components across a scratchpad affordance proximity boundary, such as illustrated in FIGS. 8-9 and further described below. A scratchpad affordance proximity boundary may make it easier for users to add components to a scratchpad without having to drag each component completely across a graphical user interface and over a scratchpad affordance, but merely in the direction of the scratchpad affordance.

In step 206, a scratchpad view is displayed. The scratchpad view may be a compact scratchpad view, such as illustrated in FIG. 9 and further described below. The scratchpad view may be a full or partial view of the scratchpad. In one embodiment, a compact scratchpad view is displayed in a section of the graphical user interface, and comprises a portion of the contents of the entire scratchpad. The compact scratchpad view may display the entire contents of the associated scratchpad, with the size of each scratchpad component proportionately scaled to fit the size of the compact view. Such proportionate scaling of component sizes may be advantageous for applications deployed across numerous platforms, such as web applications, Android phones, and iPad tablets.

As one alternative, a full scratchpad view may be displayed. For example, a user may drag an organization component from a search view toward a scratchpad affordance. After the organization hierarchy application detects that the organization component has been dragged inside a scratchpad affordance boundary surrounding the scratchpad affordance, a view of the scratchpad may be displayed. The scratchpad view may be temporary, and may be closed once a user completes the scratchpad update by dropping the organization component in the scratchpad view.

In step 208, a location of the organization component in the scratchpad is determined. In one embodiment, a first input may comprise a drag gesture, and a second input may comprise a drop gesture. In the embodiment, a location of the organization component may be determined by where a user 'drops' an organization component in a scratchpad view (e.g. a compact scratchpad view or a full scratchpad view).

Finally, in step 210, the scratchpad is updated to include the organization component reference at the determined location. A notification may be generated by the organization hierarchy application, and sent to a server. The notification may comprise a unique component identifier associated with the organization component and the location of the organization component in the scratchpad. Additionally, the scratchpad view displayed in step 206 may also be closed after the update operation is over.

Figure 3:
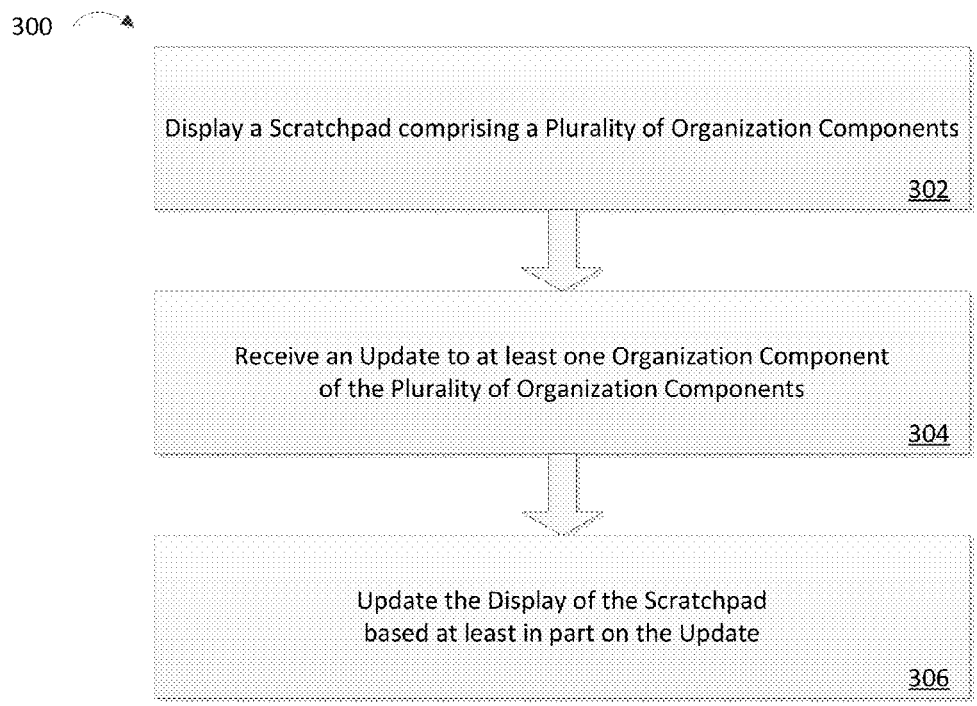
FIG. 3 is a flow chart illustrating a method according to another embodiment.
Figure 4:
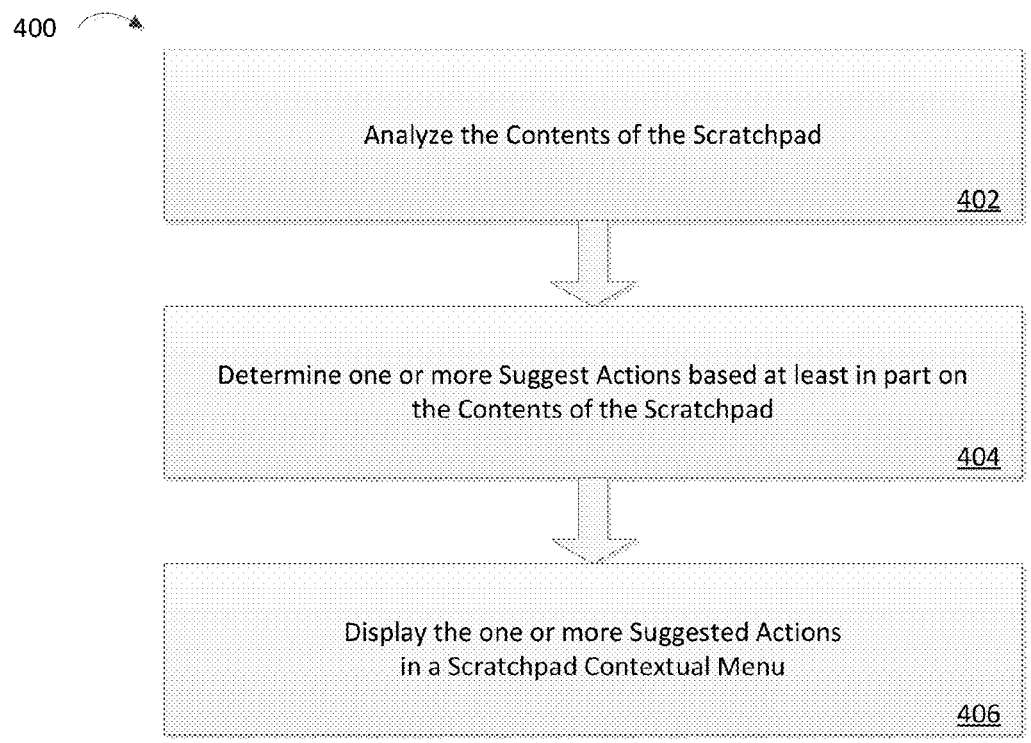
FIG. 4 is a flow chart illustrating a method according to another embodiment.

Unlike lists of static information, the contents of a scratchpad may be dynamically updated. FIG. 3 is a flow chart illustrating a method according to another embodiment. As shown in FIG. 4, in step 302 of method 300, a scratchpad is displayed comprising a plurality of organization components. Users may access a scratchpad view in a graphical user interface by clicking or activating a scratchpad affordance. As examples, a user may click on a graphical icon associated with a scratchpad, or select a scratchpad view from a menu. A scratchpad may comprise zero, one, or more organization components, such as people, projects, or files. A scratchpad may also comprise other components, such as a background image or a timeline.

A user may have different permissions for accessing, viewing, and/or editing a scratchpad. In one embodiment, a user may have full permissions, including, accessing, viewing, changing, and/or deleting the scratchpad, to any scratchpad that the user creates. A user may also full or limited permission to a scratchpad created by another user, and shared with that user. For example, each member of a team may be able to access and update a team scratchpad, but only the team leader may be able to delete the scratchpad, or invite other users to view and/or update the scratchpad. In another embodiment, a user may have predefined permissions to scratchpads based on their relationship with the scratchpad author. For example, a manager may be able to access and view a scratchpad created by her subordinates, but may not be able to change or delete the scratchpad.

In one embodiment, a scratchpad may be stored on a server, and accessed by one or more applications executing on a client device. The client devices may send and receive notifications associated with a scratchpad to and from the server. Clients and servers may exchange notifications as a scratchpad is created, updated, and/or deleted. When a user updates a scratchpad with a new organization component, the application may generate a notification comprising an identifier uniquely associated with that organization component (i.e. a unique identifier). When an organization component associated with a scratchpad is updated, a notification may be generated and sent to a client device displaying that scratchpad.

In step 304, an update to an organization component associated with a scratchpad is received. A server may receive the update from a client device in the form of a notification. An update may comprise, for example and without limitation, a change in status, new contact information (e.g. a new email address, new phone number), a progress update, and/or additional content (e.g. edits to a document, additional worksheets of a spreadsheet).

In one example, an organization member may be associated with a scratchpad. While a scratchpad is being displayed in a client, the status of an organization member in the scratchpad may be updated. As one example, before an impending meeting an organization member may update their status to "stuck in traffic" on a client device. The client device may send a notification comprising an identifier associated with the user and the status to a server. The server may determine whether that user is associated with any scratchpads, and send a notification to other client devices currently displaying a scratchpad including that user.

In step 306, the display of the scratchpad is updated based at least in part on the update. In the above example, a user viewing a scratchpad associated with the impending meeting may see that the status of the other user has changed, and be able to make appropriate plans. In another embodiment, a change to one or more components in a scratchpad may trigger a notification. For example, when a component of a scratchpad is updated, an indication such as an asterisk or star may be shown alongside the scratchpad affordance associated with that scratchpad.

FIG. 4 is a flow chart illustrating a method according to another embodiment. As shown in FIG. 4, in step 402 of method 400, the contents of a scratchpad are analyzed. The contents of a scratchpad may comprise zero, one, or more organization components. The contents of a scratchpad may also comprise other objects, such as a background image. The contents of a scratchpad may comprise one type of organization component, or a plurality of different types of organization components.

The contents of a new scratchpad may be initialized at zero or more organization components. In one embodiment, a scratchpad may be manually created, with the contents manually added by one or more users. For example, a user may start with an empty scratchpad, and drag one or more types of organization components into the scratchpad from other organization component views.

In another embodiment, a scratchpad may be automatically created. In one example, a user receives a meeting request in an email. The meeting request may trigger an organization hierarchy application to generate a meeting scratchpad associated with the meeting. The contents of the meeting scratchpad may be automatically initialized to include each accepted attendee of the meeting. Additionally, the contents of the meeting scratchpad may be initialized to include a diagram of the meeting room, and a proposed agenda for the meeting.

In step 404, one or more suggested actions may be determined based at least in part on the contents of the scratchpad. As one example, the contents of a scratchpad may comprise five organization members and a presentation file. An organization hierarchy application may determine a suggested action in the form of a "create new meeting request" based on the organization members and the file type. Another suggested action based on the contents may be "create new email message." The new email message may automatically populate the recipient list with the organization members in the scratchpad, and include the file as an attachment.

A scratchpad may have one or more default suggested actions. Examples of default suggested actions may include creating a new project, creating a new email, drafting a new document, or importing one or more organization components. A list of default suggestion actions may comprise a list of recent actions, a list of common actions, or a list of popular actions for that user. In one example, a user commonly makes phone calls and video calls from an organization hierarchy application, but rarely drafts emails or text messages. Default suggested actions for that user may comprise a new phone call and a new video call.

An organization hierarchy application may determine one or more suggested actions based on factors apart from the contents of a scratchpad. In one example, a user may access a scratchpad during a calendared meeting. A suggested action of importing organization members attending the currently calendared meeting may be determined. As another example, a user may have recently 'favorited' one or more organization components (i.e. added the organization components to a favorites list). When the user accesses an empty scratchpad, a suggested action may be to import the recently 'favorited' organization components.

Figure 12:
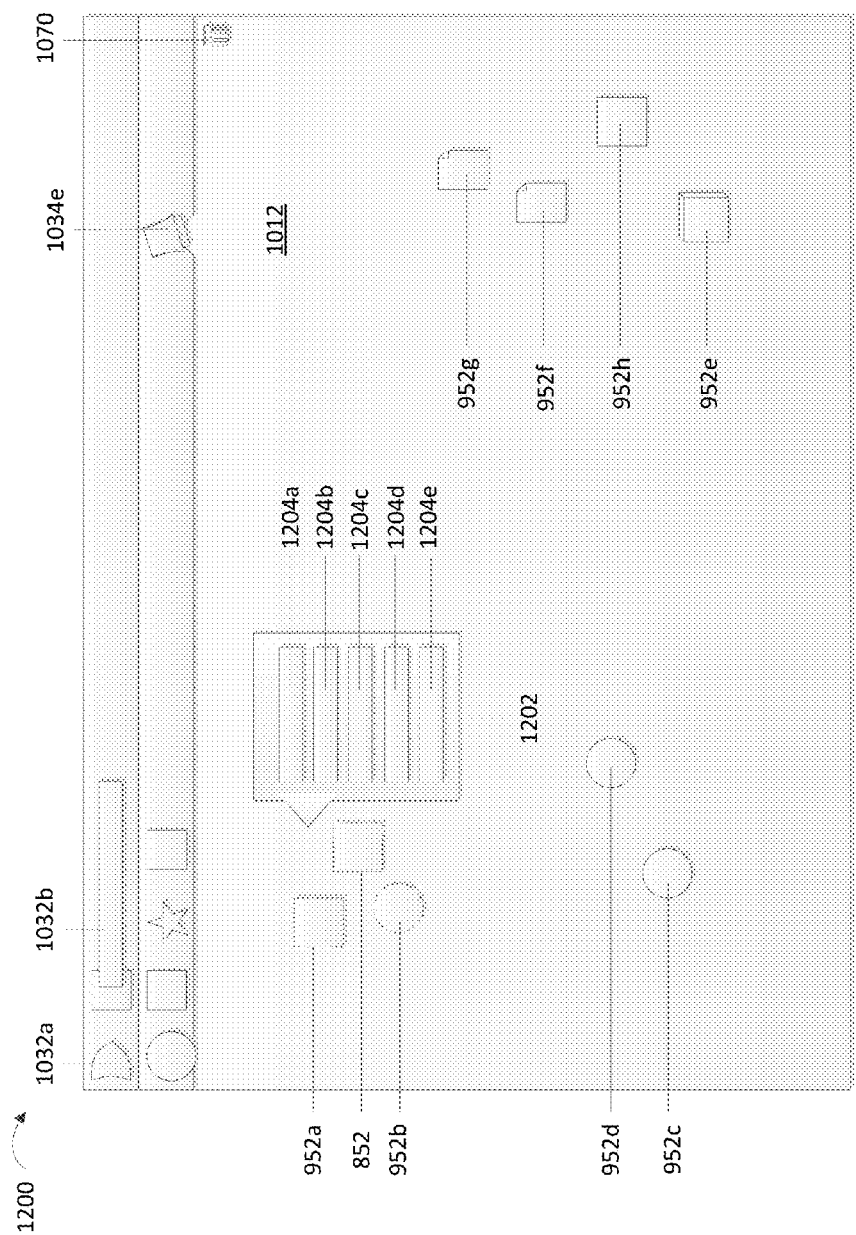

In step 406, one or more suggested actions may be displayed in a scratchpad contextual menu. A contextual menu may be accessed in a variety of manners, for example and without limitation, through a specific gesture (e.g. double tap, right click, down swipe), by clicking on a portion of the scratchpad view (e.g. a specific region of the scratchpad view, an empty portion of the scratchpad view), and/or by clicking or activating an contextual action affordance (e.g. menu icon). As one alternative, a contextual menu may automatically be generated and displayed in a scratchpad view. An example of a contextual menu of suggested actions is illustrated in FIG. 12, described in further detail below.

A scratchpad may be manually or automatically created. In one embodiment, a scratchpad associated with an event may be automatically created. For example, a meeting scratchpad may be automatically created based on a scheduled team meeting. When a scratchpad is automatically created, the initial contents of the scratchpad may be determined by an associated event. The initial contents of a meeting scratchpad may comprise each member planning to attend the meeting, as well as a diagram of the meeting room, and any documents that may be discussed during the meeting, such as meeting slides.

In another embodiment, a scratchpad associated with a project may be automatically created. For example, a project scratchpad may be automatically created based on a new or existing project. The initial contents of a project scratchpad may comprise each member associated with the project, the project timeline, and one or more project files.

Illustrated System

Figure 5:
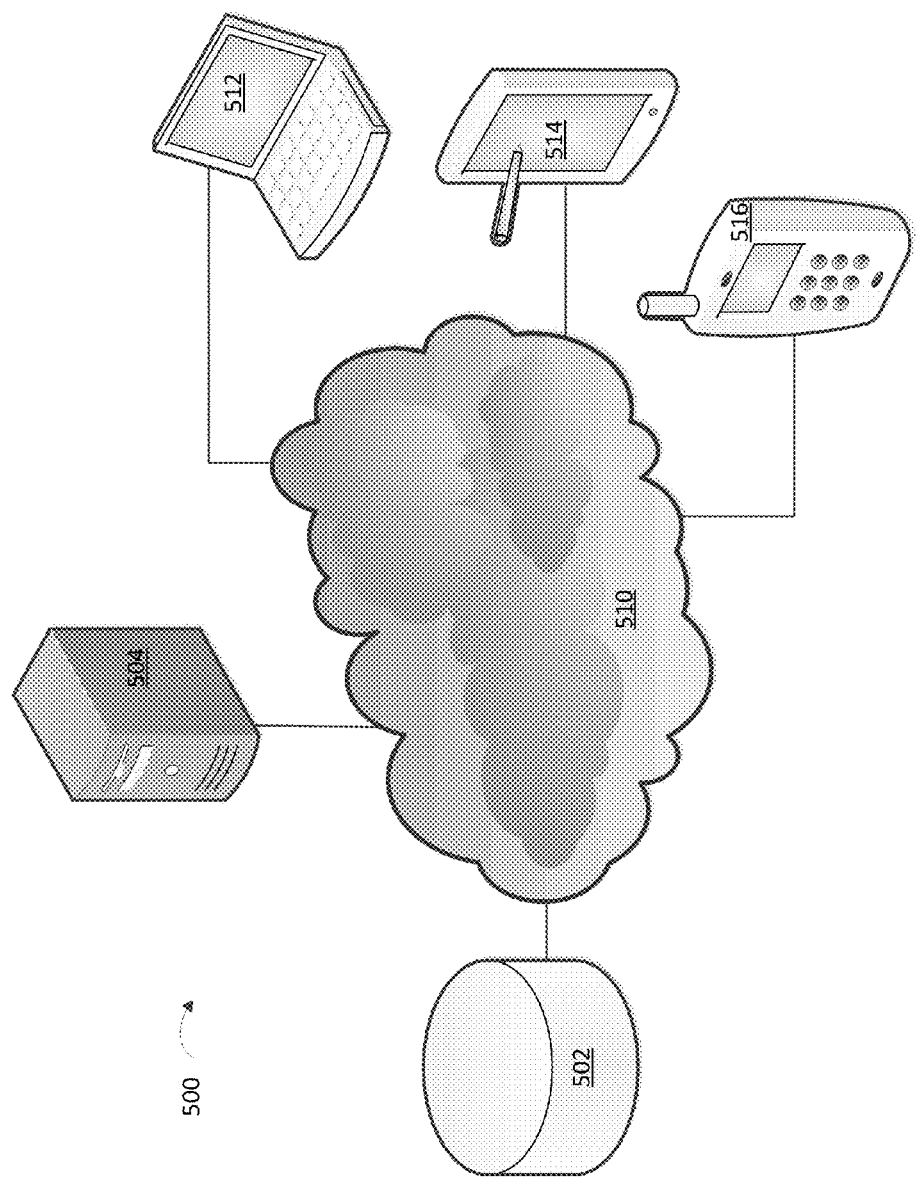
FIG. 5 is a diagram illustrating a system according to an embodiment.

FIG. 5 is a diagram illustrating a system of according to embodiment. System 500 comprises data store 502, server 504, and client devices 512, 514, 516. Server 504, data store 502, and client device 512 may be in communication over network 510. Data store 502 may comprise one or more repositories for data, such as one or more databases. Non-limiting examples of data store 502 include an Active Directory database and a corporate directory. As illustrated in FIG. 5, client device 512 comprises a personal computer, client device 512 comprises a tablet computer 514, and client device 516 comprises a smart phone 516. In other embodiments, other types of devices may be used.

Client devices 512, 514, 516 may be configured to generate a graphical user interface, and execute an application that displays application components within the graphical user interface. The application may comprise a native mobile device application such as an iOS iPad application, a Windows Phone application, or an Android application. As one alternative, the application may comprise a web application accessed through a web browser. In one embodiment, client devices 512, 514, 516 display an organization hierarchy application within a graphical user interface, such as in the native operating system, or within a web browser.

Illustrated Screenshots

Figure 6:
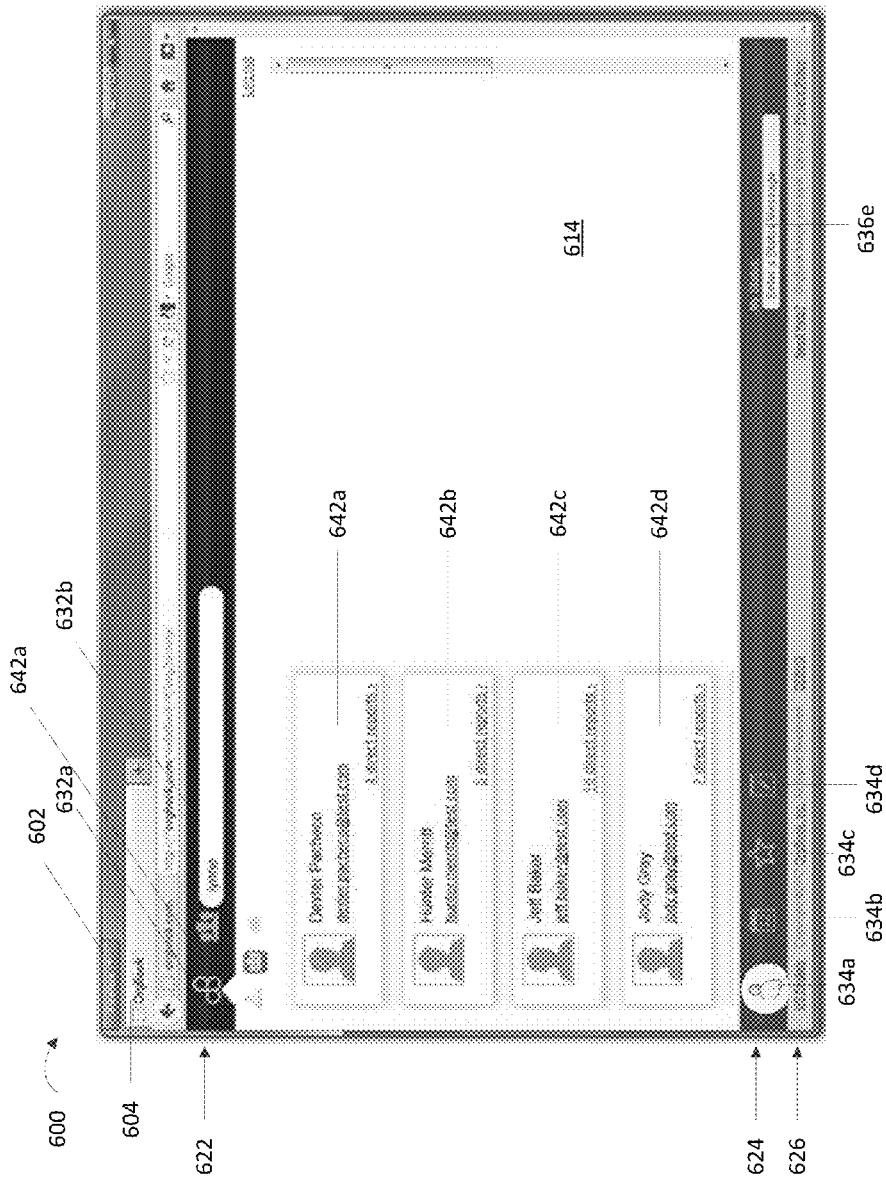
FIGS. 6-7 are screenshots screenshot illustrating embodiments.
Figure 7:
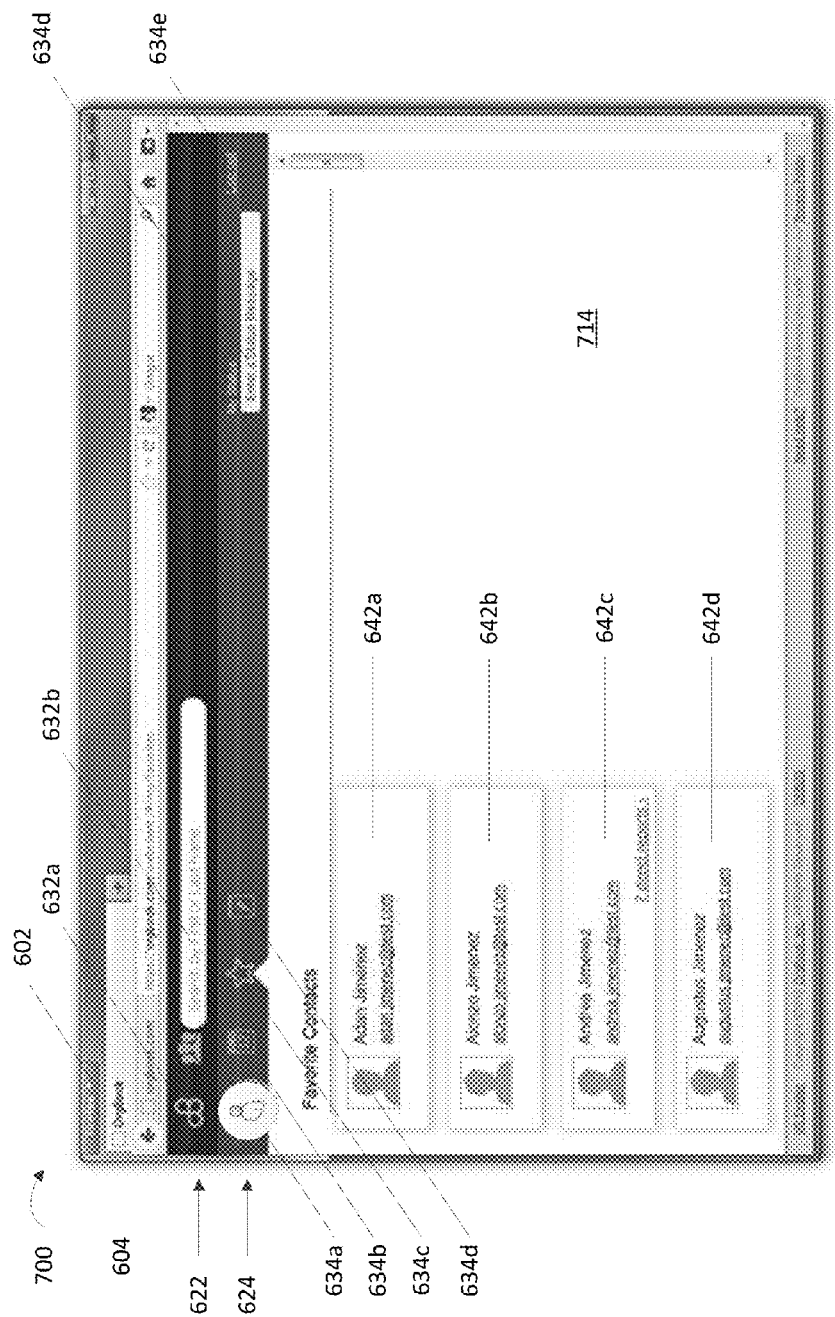

FIGS. 6-7 are screenshots illustrating embodiments for viewing and navigating perspectives of a data set. According to the illustrations, FIGS. 6-7 comprise screenshots 600, 700, of web application 604 executing in web browser 602. In other embodiments, an application may comprise a native application, such as an iPad application, Windows Phone application, or Android application, operating on a tablet, smart phone, or other device.

Turning to FIG. 6, web application 604 has arranged a data set into three perspectives: an organization perspective, a personal perspective, and a meta perspective. In other embodiments, an application may arrange a data store into any number of perspectives. Web application 604 provides organization perspective affordance bar 622, personal perspective affordance bar 624, and meta affordance bar 626. Web application 604 also provides profile view 614a.

As illustrated in FIG. 6, affordance bars 622, 624, 626 comprise horizontal bars, each including a plurality of affordances. In other embodiments, one or more affordance bars may comprise vertical bars, and may include one or more affordances.

Organization perspective affordance bar 622 comprises organization perspective affordances 632a, 632b, including organization chart affordance 632a and organization search affordance 632b. As shown in FIG. 6, organization chart affordance 632a is depicted as a graphical icon, and organization search affordance 632b is depicted as a text input field. In other embodiments an affordance may comprise other types of graphical objects.

Personal perspective affordance bar 624 comprises personal perspective affordances 634a, 634b, 634c, 634d, 634e including profile affordance 634a, recents affordance 634b, favorites affordance 634c, status affordance 634d and logout affordance 634e. Some affordances may not be associated with a view. Logout affordance 634e, for example, may trigger the application to log a user out and close the application, without displaying an associated view. Other affordances may be associated with a view. As shown in FIG. 6, profile view 614a may be associated with profile affordance 634a. Profile view 614a displays one view of the personal perspective of the data set.

FIG. 7 is a screenshot illustrating another embodiment. As illustrated in FIG. 7, web application 604 displays a second view of the personal perspective in the form of recents view 614b. Recents view 614b may be associated with recents affordance 634b. Web application 604 also displays indicator 644b. Indicator 644b may provide an indication of the affordance associated with the active view. As shown in FIG. 7, indicator 644 points to recents affordance 634b, indicating that a view associated with recents affordance 634b (e.g. recents view 614b) is the active view.

FIGS. 8-13 are diagrams illustrating another embodiment for creating, arranging, and leveraging an ad-hoc collection of heterogeneous organization components. The diagrams depicted in FIGS. 8-13 may reflect an organization hierarchy application executing in a graphical user interface, such as on an iPad, iPhone, Android phone, Windows phone, or web browser. An organization hierarchy application may generate one or more views of an organization hierarchy. A view of an organization hierarchy may comprise one or more organization components. Examples of organization components may include, for example and without limitation, organization members, teams, departments, resources, files, emails, logs, projects, goals, or tasks.

Turning to FIG. 8, diagram 800 an application program comprising view 812. View 812 may comprise a search view of an organization hierarchy, and be associated with search affordance 832b. A user may access view 812 by clicking search affordance 832b, or, in one alternative, by inputting a search string into a text bar of search affordance 832b. In one example, a user may enter a search string, such as a last name, skill, or location, in a search dialog box (i.e. a search affordance), and the results of the search may be displayed in view 812.

In some embodiments, a view may be accessed by clicking or activating an associated affordance. An affordance may comprise a graphical object (e.g. icon) associated with one or more interactions in the application. One or more affordances may be arranged on an affordance bar in the graphical user interface. In FIG. 8, diagram 800 comprises first affordance bar 822 and second affordance bar 824. First affordance bar 822 comprises affordances 832a-832b. Second affordance bar 824 comprises affordances 834a-834e. An affordance bar may comprise one or more affordances, e.g. one, two, three, or more affordances. Each affordance bar may be associated with a perspective of a data set.

As shown in FIG. 8, organization hierarchy application generates organization component view 812 comprising a plurality of organization components 842a-842g. In one embodiment, organization component view 812 may be associated with search affordance 832b, and organization components 842a-842g may coincide with the results of a search. In other embodiments, an organization component view may be associated with other affordances and/or other views of an organization. Other organization hierarchy views may comprise a card view, a tree view, a creative view, or a flow view. In a card view, a navigable organization hierarchy may be displayed, including one or more profiles, or cards, representing individual organization components. Each organization component view may be associated with a different affordance, and may be accessed by selecting or activating the associated affordance.

Affordances generated by an organization hierarchy application may be organized according to a perspective. In FIG. 8, affordances 832a and 832b may be associated with a first perspective, and affordances 834a, 834b, 834c, 834d, 834e may be associated with a second perspective. In other embodiments, affordances may be associated with one, two, three, or more perspective. Affordances associated with a perspective may be displayed on an affordance bar associated with that perspective. In FIG. 8, first affordance bar 822 comprises affordance 832a and affordance 832b, while second affordance bar 824 comprises affordances 834a-834e.

A scratchpad may facilitate quick, intuitive interactions with a group of organization components. Users may perform various tasks, such as emailing a team, managing a project, or preparing for a meeting, through a scratchpad. Users may naturally begin to utilize a scratchpad by manually adding one or more organization components to a scratchpad. Scratchpads may also be created by other users, or be automatically created. A new scratchpad may be initialized in an empty state, or with no initial organization components. In one alternative, a scratchpad may be initialized with one or more organization components.

A scratchpad may be updated using the graphical user interface in a variety of manners. In one embodiment, a user may add one or more organization components to a scratchpad through a drag-and-drop input, for example, by dragging an organization component to a scratchpad affordance. As shown in FIG. 8, a user selects organization component 842c, and drags organization component proxy 842c in the direction of arrow 802 toward scratchpad affordance 834e. In another embodiment, a user may select a plurality of organization components, and drag the selection to a scratchpad affordance. In still another embodiment, a user may engage a menu system, such as by right clicking on an organization component, to add an organization component to a scratchpad.

An organization hierarchy application may detect an update to a scratchpad based on an input associated with an organization component. In one embodiment, an update to a scratchpad may be detected based on an input indicating that one or more organization components are dragged in proximity to a scratchpad affordance. In FIG. 8, organization component 842c has been selected and dragged, or moved, in the direction of arrow 802 towards scratchpad affordance 834e. Diagram 900 of FIG. 9 depicts the continuation of the dragging operation in FIG. 8. In FIG. 9, organization component 842c has been dragged closer to scratchpad affordance 834e and inside scratchpad affordance proximity boundary 836.

An organization hierarchy application may detect an update to the scratchpad by detecting an input associated with an organization component and the scratchpad. In some embodiments, an organization hierarchy application may define a scratchpad affordance proximity boundary. A scratchpad affordance proximity boundary may be used to determine that a user intends to update a scratchpad with one or more organization components. As shown in FIG. 9, the organization hierarchy application detects an update to the scratchpad as the user drags the organization component 844 inside scratchpad affordance proximity boundary 836.

By generating a scratchpad affordance proximity boundary, a user may not have to drag organization components entirely over to a scratchpad affordance, but merely in close proximity to the scratchpad affordance. A scratchpad affordance proximity boundary may be visible or invisible to the user. The scratchpad affordance proximity boundary may be larger than scratchpad affordance, as illustrated in FIG. 9. In some alternatives, a scratchpad affordance proximity boundary may be smaller, for example, approximately the same size as the scratchpad affordance 834e. The size of the scratchpad affordance proximity boundary may be determined based on the client device. A tablet device, with a large display, may generate a larger scratchpad affordance proximity boundary, while a smart phone device, with a smaller display, may generate a smaller scratchpad affordance proximity boundary. In one embodiment, an organization hierarchy application may detect an update to the scratchpad when one or more organization components are dragged inside scratchpad affordance proximity boundary 836.

After detecting an update to the scratchpad, a scratchpad view may be displayed. The scratchpad view may comprise a full or partial view of the contents of the scratchpad, and may take up some or the entire graphical user interface. As shown in FIG. 9, diagram 900 comprises compact scratchpad view 960 associated with a scratchpad. Compact scratchpad view 960 may be displayed based on the detection of an update to the scratchpad associated with organization component 842c.

A compact scratchpad view may comprise a view of a scratchpad that fills some, but not all, of the graphical user interface. In one embodiment, a compact scratchpad view may reflect the entire contents of the scratchpad. For example, each organization component of the scratchpad may be shown in the compact scratchpad view. In another embodiment, a compact scratchpad view may show a portion of the contents of the associated scratchpad.

A compact scratchpad view may be displayed based on a detection of an update to a scratchpad. In one embodiment, the display of a compact scratchpad view may be triggered when a user drags an organization component onto or in proximity to a scratchpad affordance. Compact scratchpad view 960 is displayed as a user drags organization component 842c across scratchpad affordance proximity boundary 836.

As shown in FIG. 9, compact scratchpad view 960 comprises organization components 952a-952h. A user may specify a location of organization component 842c in the scratchpad by dropping organization component 842c in a particular location of compact scratchpad view 960. Thus the location of the new organization component in the scratchpad may be determined based on an input such as a drag-and-drop input. After an organization component has been dropped into a scratchpad, the compact scratchpad view 960 may be closed.

An organization hierarchy application may provide access to different views through one or more affordances in a graphical user interface. According to diagram 1000 of FIG. 10, scratchpad view 1012 may be displayed by an application such as an organization hierarchy application. In one embodiment, scratchpad view 1012 may be accessed through scratchpad affordance 834e. For example, a user may click, select, or otherwise activate scratchpad affordance 834e.

Figure 10:
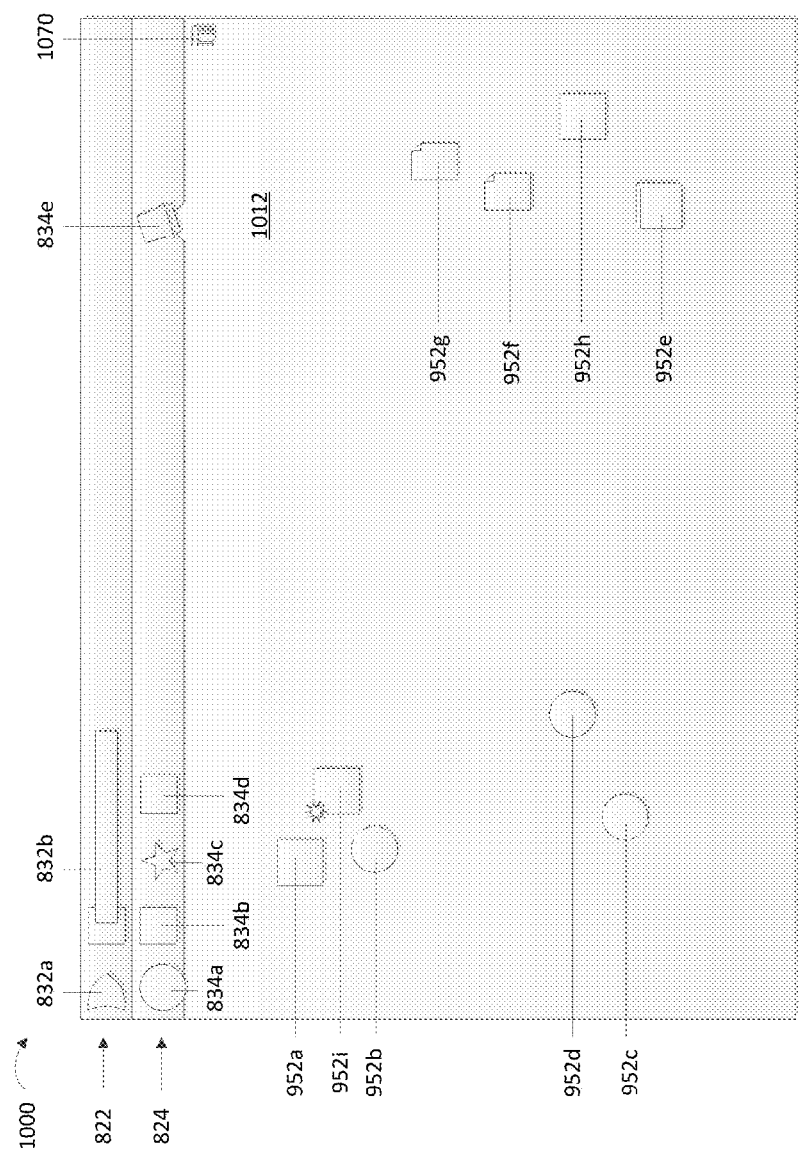

As shown in FIG. 10, the scratchpad associated with scratchpad view 1012 comprises scratchpad components 952a-952i. New components recently added and/or updated in scratchpad may comprise a visual indicator. In FIG. 10, new scratchpad component 952i comprises an asterisk, which may reflect that the new scratchpad component 952i was recently added to the scratchpad.

Scratchpad view 1012 may be associated with a first scratchpad. In one embodiment, a user may be limited to accessing, viewing, and/or updating a single scratchpad. In other embodiments, a user may access, view, and/or update a plurality of scratchpads. A scratchpad may be associated with one or more access permissions, which may define which users in an organization may access, view, and/or update a scratchpad. Some scratchpads may be associated with a plurality of users, such as a team scratchpad, meeting scratchpad, or department scratchpad. A team scratchpad may be viewed and/or updated by some or all members of a team. In some organizations, a manager may be automatically granted permissions to view scratchpads created by their subordinates.

Users may manipulate a scratchpad in various manners, for example, by adding new scratchpad components, moving components within the scratchpad, and resizing scratchpad components. Users may also launch actions from a scratchpad, for example, creating a new meeting event, emailing a group of employees, or sharing files. A user may begin to manipulate the contents of a scratchpad by selecting one or more of the scratchpad components. Scratchpad components may be selected by clicking on each intended component, through key commands, or other mechanisms. In diagram 1100 of FIG. 11, selection box 1102 is drawn around scratchpad components 952a, 952b, 852.

Figure 11:
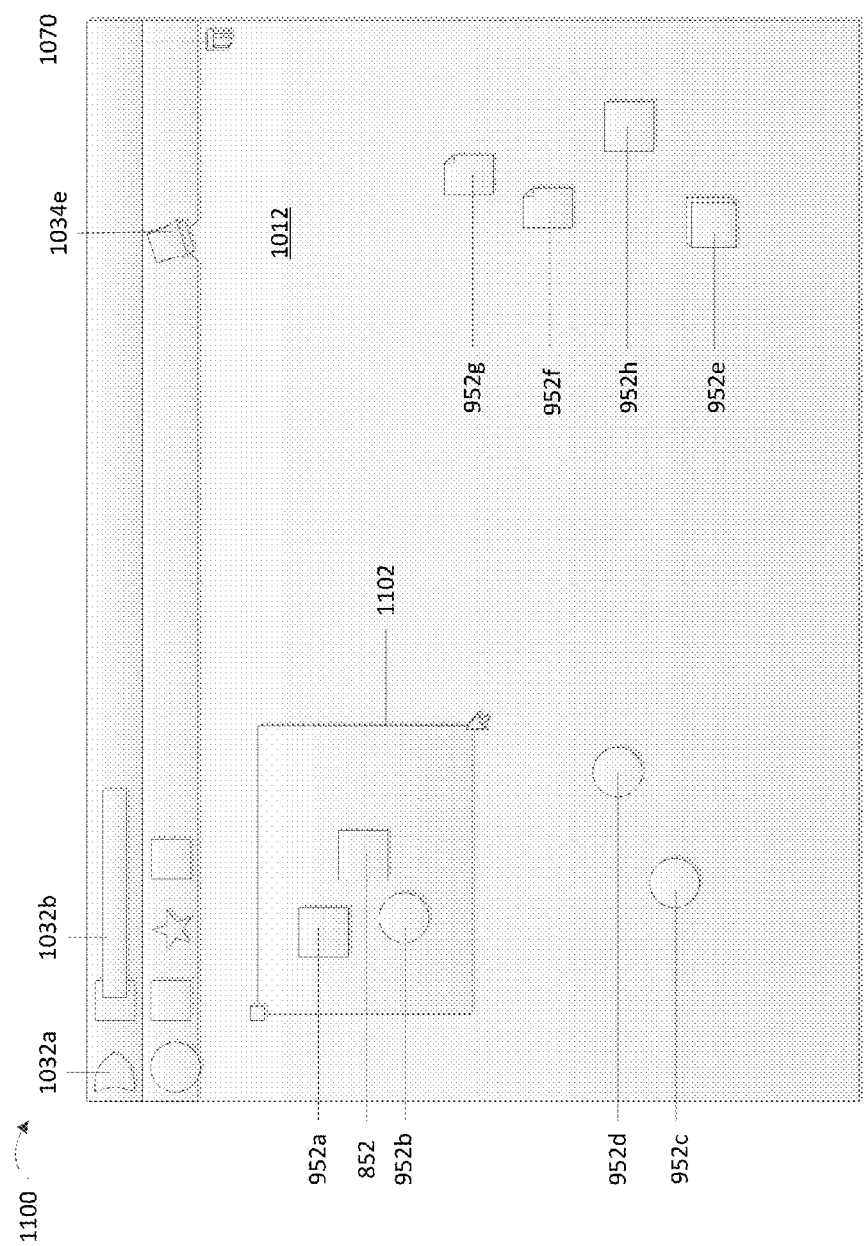

Diagram 1200 of FIG. 12 reflects the selection of scratchpad components 952a, 952b, 852 shown in FIG. 11. Additionally, in diagram 1200, action menu 1202 is displayed. Action menu 1202 comprises actions 1204a-1204e. Examples of actions may include, without limitation, composing a new email message, creating a new meeting, or sending an alert.

One or more of actions 1204a-1204e displayed in an action menu may be determined by analyzing the contents of the scratchpad. In one embodiment, an action displayed in the suggested action menu may be based at least in part on a subset of the scratchpad contents, such as scratchpad components 952a, 952b, 852 selected in FIG. 11.

A scratchpad view may comprise one or more affordances specific to a scratchpad. As shown in FIGS. 10-13, scratchpad view 1012 comprises remove affordance 1070, illustrated as a trash can. A user may delete or remove one or more scratchpad components by dragging and dropping the components over to the remove affordance 1070. In other embodiments, a scratchpad component may be removed from a scratchpad through a menu selection, or remotely by another user.

Figure 13:
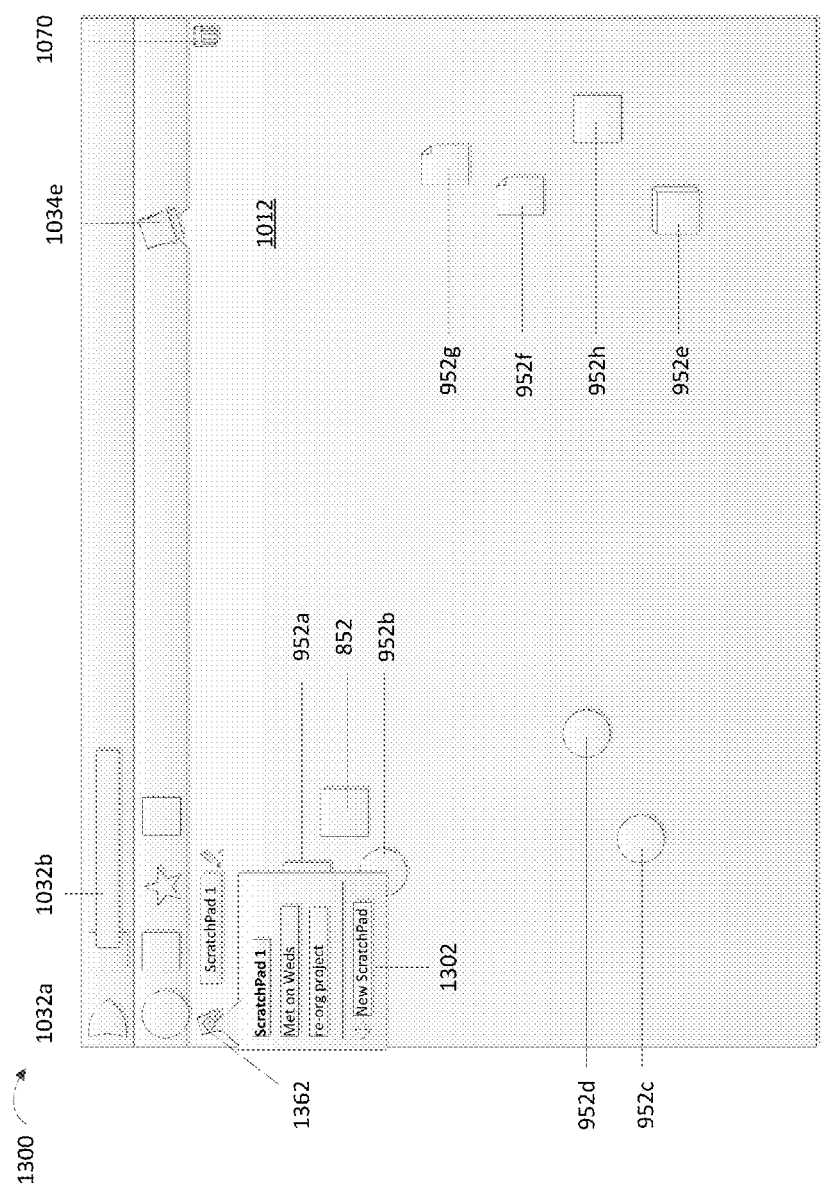

In diagram 1300 of FIG. 13, a user may activate scratchpad selection affordance 1362. As shown in FIG. 13, activation of scratchpad selection affordance 1362 may trigger display of scratchpad selection menu 1302. Scratchpad selection menu 1302 may comprise a list of scratchpads accessible to a user. In the illustrated embodiment, scratchpad selection menu 1302 comprises three scratchpad list entries, as well as an option to create a new scratchpad.

According to the illustrated embodiments in FIGS. 8-13, scratchpad view 1012 is associated with a first scratchpad, and comprises organization components 962a-962h. In addition, scratchpad view 1012 comprises newly added organization component 842c. The scratchpad may have been updated with to include organization component 842c through a drag and drop input, such as illustrated by FIGS. 8-9. When a scratchpad is accessed, new scratchpad components may comprise an indicator, such as a star, highlighting, or other visual indication showing that it is a newly added component.

FIGS. 14-16 are diagrams illustrating another embodiment for creating, arranging, and leveraging an ad-hoc collection of heterogeneous organization components. In the illustrated embodiment of FIGS. 14-16, a user selects a plurality of organization components for adding to a scratchpad, drags the organization components to a scratchpad affordance, and selects one of a plurality of scratchpads for updating. The organization components may be displayed by an organization hierarchy application within a graphical user interface As shown in diagram 1400 of FIG. 14, an application generates view 1412 comprising a plurality of application components 1444a, 1444b, 1444c. An application may generate one or more views. Each view may be associated with an affordance. In diagram 1400, view 1412 may be associated with affordance 1434b. A view may comprise zero, one, or more application components. Affordances may be arranged on an affordance bar. In diagram 1400, the application generates a first affordance bar 1422, comprising affordances 1432a, 1432b, and a second affordance bar 1424, comprising affordances 1434a-1434e.

As shown in diagram 1400, view 1412 comprises application components 1444a, 1444b, 1444c. One or more application components shown in an application view may be selected by a user. In diagram 1400, component selection 1446 comprises selected application components 1444b and 1444c. Application components may be selected through a variety of manners, for example, by using a selection box, through key-commands, through particular touch-screen gestures, or by ctrl-selecting each component. In embodiments, a component selection may comprise one, two, three, or more application components. A component selection may comprise application components of one or more types.

A user may update a scratchpad by selecting one or more application components, and generating an input associated with the selected application component and a scratchpad affordance. In one embodiment, a user may select one or more application components in a graphical user interface, and drag the components toward a scratchpad affordance. As shown in FIG. 14, a user drags component selection 1446 in the direction of arrow 1402, toward scratchpad affordance 1434e and scratchpad affordance proximity boundary 1436.

In diagram 1500 of FIG. 15, display of compact scratchpad view 1560 may be triggered as the user drags component selection 1446 across or over scratchpad affordance proximity boundary 1436. Compact scratchpad view 1560 comprises scratchpad components 1452a-1452h. Each scratchpad component 1452a-1452h may be associated with an application component. In a different embodiment, some or all of the scratchpad components may not be associated with an application component.

One or more scratchpads may be accessible through an application. An application may generate a scratchpad selection affordance to choose between different scratchpads accessible through the application. As shown in FIGS. 15-16, compact scratchpad view 1560 comprises scratchpad selection affordance 1562. Scratchpad selection affordance 1562 comprises an icon that may indicate additional scratchpads for use. Scratchpad selection affordance 1562 further comprises a text field, illustrated as showing the text "Scratchpad 1" for indicating which scratchpad is currently being displayed and/or updated.

In diagram 1600 of FIG. 16, component selection 1446 is illustrated as being dragged within compact scratchpad view 1560 toward scratchpad selection affordance 1562. By using scratchpad selection affordance 1562, a user may select a different scratchpad for updating with component selection 1446. In one embodiment, after the scratchpad selection affordance 1562 is activated, or triggered, a list of one or more accessible scratchpads may be shown. In another embodiment one or more additional scratchpad views may be displayed after the scratchpad selection affordance 1562 is activated or triggered. The scratchpad selection affordance 1562 may be activated by detecting an input associated with the scratchpad selection affordance 1562, such as a user dragging a component selection onto or near scratchpad selection affordance 1562.

Scope

Embodiments of a subset or all and portions or all of the above may be implemented by program instructions stored in a memory medium or carrier medium and executed by a processor. A memory medium may be a transitory medium or non-transitory medium. A memory medium may include any of various types of memory devices or storage devices. The term "memory medium" is intended to include an installation medium such as a Compact Disc Read Only Memory (CD-ROM) floppy disks, tape device, a computer system memory or random access memory such as Dynamic Random Access Memory DRAM Double Data Rate Random Access Memory DDR RAM Static Random Access Memory SRAM Extended Data Out Random Access Memory EDO RAM Rambus Random Access Memory RAM etc. or a non-volatile memory such as a magnetic media e.g. a hard drive or optical storage. The memory medium may comprise other types of memory as well or combinations thereof. In addition the memory medium may be located in a first computer in which the programs are executed or may be located in a second different computer that connects to the first computer over a network such as the Internet. In some instances the second computer may provide program instructions to the first computer for execution. The term memory medium may include two or more memory mediums that may reside in different locations e.g. in different computers that are connected over a network.

In some embodiments a computer system at a respective participant location may include a memory medium on which one or more computer programs or software components according to one embodiment of the present invention may be stored For example the memory medium may store one or more programs that are executable to perform the methods described herein The memory medium may also store operating system software as well as other software for operation of the computer system.

Modifications and alternative embodiments of one or more aspects of the invention may be apparent to those skilled in the art in view of this description. Accordingly this description is to be construed as illustrative only and is for the purpose of teaching those skilled in the art the general manner of carrying out the invention. It is to be understood that the forms of the invention shown and described herein are to be taken as embodiments. Elements and materials may be substituted for those illustrated and described herein, parts and processes may be reversed, and certain features of the invention may be utilized independently, all as would be apparent to one skilled in the art rely after having the benefit of this description of the invention. Changes may be made in the elements described herein without departing from the spirit and scope of the invention as described above and below.

What is claimed is:

1. A method for creating, arranging, and leveraging an ad-hoc collection of heterogeneous organization components, the method comprising the steps of:

displaying an organization hierarchy application comprising an organization component view in a graphical user interface to a user, the organization component view comprising a first organization component;

displaying, in the graphical user interface, a scratchpad affordance associated with a scratchpad;

detecting, by the organizational hierarchy application, an update to the scratchpad based on an input from the user associated with a first organization component of the one or more organization components and the scratchpad affordance;

updating the scratchpad based at least in part on the input;

presenting to the user contextual actions based at least in part on the input, wherein the contextual actions are associated with the organization components;

generating a notification comprising a component identifier associated with the first organization component and the scratchpad; and determining a geo-location of the first organization component in the scratchpad container based at least in part on the scratchpad addition input, and wherein the notification further comprises the geo-location.

2. The method of claim 1, wherein the first organization component comprises one of an organization member, a project, a calendar event, a news feed, or a file.

3. The method of claim 1, wherein the notification further comprises a timestamp.

4. The method of claim 1, wherein the component identifier comprises a unique component identifier.

5. The method of claim 1, wherein the scratchpad affordance comprises a graphical representation of the scratchpad.

6. The method of claim 1, further comprising:

displaying the scratchpad and the first organization component.

7. The method of claim 6, wherein the scratchpad container view comprises a background image.

8. The method of claim 6, wherein the scratchpad container comprises a scratchpad widget.

9. The method of claim 1, further comprising:

determining at least one action based at least in part on one or more organization components stored in the scratchpad container; and displaying an affordance for the at least one action in a contextual scratchpad menu.

10. The method of claim 1, wherein the scratchpad comprises a first scratchpad and the scratchpad affordance is associated with the first scratchpad and a second scratchpad.

11. The method of claim 6, further comprising:

detecting an update to the scratchpad container associated with a second organization component; and updating the scratchpad view to display the first organization component and the second organization component.

12. The method of claim 1, wherein the input comprises a first input and further comprising:

displaying a view of the scratchpad;

determining a geo-location of the first organization component in the scratchpad based at least in part on a second input; and wherein the scratchpad is updated based at least in part on the first input and the geo-location.

13. The method of claim 12, wherein the view comprises a compact view of the scratchpad.

14. The method of claim 1, wherein a server receives the notification, and further comprising:

updating the scratchpad with a reference to the organization component.

* * * * *